United States Patent
Dawson et al.

(10) Patent No.: US 8,245,283 B2
(45) Date of Patent: Aug. 14, 2012

(54) REGION ACCESS AUTHORIZATION IN A VIRTUAL ENVIRONMENT

(75) Inventors: Christopher J. Dawson, Arlington, VA (US); Vincenzo V. Diluoffo, Sandy Hook, CT (US); Rick A. Hamilton, II, Charlottesville, VA (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 493 days.

(21) Appl. No.: 12/396,715

(22) Filed: Mar. 3, 2009

(65) Prior Publication Data

US 2010/0229235 A1    Sep. 9, 2010

(51) Int. Cl.
*H04L 9/32* (2006.01)
*G06F 21/00* (2006.01)

(52) U.S. Cl. ............. 726/4; 726/2; 726/3; 726/5; 726/6; 713/155; 713/156; 715/706

(58) Field of Classification Search .................. 726/2–6; 715/706; 713/155–156
See application file for complete search history.

(56) References Cited

U.S. PATENT DOCUMENTS

| | | | |
|---|---|---|---|
| 5,293,614 A | | 3/1994 | Ferguson et al. |
| 5,802,296 A | * | 9/1998 | Morse et al. ................... 709/208 |
| 6,271,843 B1 | | 8/2001 | Lection et al. |
| 6,279,112 B1 | * | 8/2001 | O'Toole et al. ................. 726/10 |
| 6,292,198 B1 | | 9/2001 | Matsuda et al. |
| 6,525,736 B1 | | 2/2003 | Erikawa et al. |
| 6,636,210 B1 | | 10/2003 | Cheng |
| 6,802,007 B1 | | 10/2004 | Canelones et al. |
| 7,058,897 B2 | | 6/2006 | Matsuda |
| 7,269,632 B2 | | 9/2007 | Edeker et al. |
| 7,814,153 B2 | * | 10/2010 | Flesch et al. ................... 709/205 |
| 7,913,176 B1 | * | 3/2011 | Blattner et al. ................. 715/758 |
| 2002/0188678 A1 | | 12/2002 | Edecker |
| 2003/0014423 A1 | * | 1/2003 | Chuah et al. ................... 707/102 |
| 2006/0119598 A1 | | 6/2006 | Littlefield |
| 2006/0178966 A1 | | 8/2006 | Jung et al. |
| 2007/0008782 A1 | | 1/2007 | Sinha et al. |
| 2007/0149290 A1 | | 6/2007 | Nickell et al. |
| 2008/0204448 A1 | | 8/2008 | Dawson et al. |
| 2008/0215994 A1 | | 9/2008 | Harrison et al. |
| 2008/0263458 A1 | * | 10/2008 | Altberg et al. ................. 715/757 |
| 2009/0046109 A1 | | 2/2009 | Hamilton, II et al. |
| 2009/0113314 A1 | | 4/2009 | Dawson et al. |
| 2009/0132296 A1 | * | 5/2009 | Jung et al. ......................... 705/4 |
| 2009/0158170 A1 | | 6/2009 | Narayanan et al. |

(Continued)

OTHER PUBLICATIONS

Yang, et al., "Hierarchical Animation Control of Avatars in 3-D Virtual Environments", IEEE Transactions on Instrumentation and Measurement, vol. 54, No. 3 (Jun. 3, 2005).

(Continued)

*Primary Examiner* — Yin-Chen Shaw
(74) *Attorney, Agent, or Firm* — William E. Schiesser, Esq.; Kevin P. Radigan, Esq.; Heslin Rothenberg Farley & Mesiti P.C.

(57) ABSTRACT

The passage of avatars into and out of regions in a virtual universe is regulated through the use of secure communications between and among the avatar, an authority managing of the region and a trusted third party who maintains a database of avatar characteristics. Permission to move from one virtual region to another is determined based upon the avatar characteristics.

21 Claims, 3 Drawing Sheets

U.S. PATENT DOCUMENTS

| | | | |
|---|---|---|---|
| 2009/0177717 A1* | 7/2009 | Meehan et al. | 707/204 |
| 2009/0216691 A1 | 8/2009 | Borzestowski et al. | |
| 2009/0235350 A1* | 9/2009 | Garbow et al. | 726/15 |
| 2009/0251457 A1 | 10/2009 | Walker et al. | |
| 2009/0254968 A1* | 10/2009 | Bussani et al. | 726/1 |
| 2009/0276718 A1 | 11/2009 | Dawson et al. | |
| 2010/0023885 A1 | 1/2010 | Reville et al. | |
| 2010/0037147 A1 | 2/2010 | Champion et al. | |
| 2010/0057478 A1 | 3/2010 | Hamilton et al. | |
| 2010/0064359 A1 | 3/2010 | Boss et al. | |
| 2010/0081508 A1* | 4/2010 | Bhogal et al. | 463/40 |
| 2010/0138455 A1* | 6/2010 | Alewine et al. | 707/803 |

OTHER PUBLICATIONS

Arrison, S., "'Second Life' Lessons from a Virtual World", TechNewsWorld, Tech Buzz, pp. 1-3 (Jul. 31, 2008).

Carter, et al., "Untangling the Web—Exploring Methods of Accessing Virtual Worlds", AFB Access World, vol. 9, No. 2, pp. 1-12 (Mar. 2008).

Dawson et al., Office Action for U.S. Appl. No. 12/114,228, filed May 2, 2008 (U.S. Patent Publication No. 2009/0276718 A1), dated Mar. 3, 2011.

Dawson et al., Final Office Action for U.S. Appl. No. 12/114,228, filed May 2, 2008 (U.S. Patent Publication No. 2009/0276718 A1), dated Aug. 10, 2011.

Boss et al., Office Action for U.S. Appl. No. 12/208,515, filed Sep. 11, 2008 (U.S. Patent Publication No. 2010/0064359 A1), dated Dec. 9, 2011.

\* cited by examiner

REGION ACCESS AUTHORIZATION IN A VIRTUAL ENVIRONMENT

CROSS REFERENCE TO CO-PENDING APPLICATIONS

Commonly owned U.S. patent applications Ser. No. 12/208,515, entitled "USER CREDENTIAL VERIFICATION INDICATION IN A VIRTUAL UNIVERSE", filed on Sep. 11, 2008; Ser. No. 12/198,145, entitled "SOFTWARE SCAN TRIGGERS FOR PROTECTION OF VIRTUAL ENVIRONMENTS", filed on Aug. 26, 2008; 12/548,462, entitled "SOFTWARE SCAN TRIGGERS FOR PROTECTION OF VIRTUAL ENVIRONMENTS"; and Ser. No. 12/114,228, entitled "VIRTUAL WORLD TELEPORTATION", filed on May 2, 2008, contain subject matter related, in certain aspects, to the subject matter of the present application. The above-identified patent applications are incorporated herein by reference.

FIELD OF THE INVENTION

The present invention is generally directed to virtual universes (VU). More particularly, the present invention is directed to the identification of avatars in a Virtual Universe (VU) and their authorization to perform certain acts, particularly the entry into or exit from regions in the virtual universe. The present invention is therefore seen to describe a method by which avatars are identified and authorized to move between regions.

BACKGROUND OF THE INVENTION

A virtual world or virtual universe, sometimes designated by the acronym VU, is a computer based, simulated environment intended for its users to inhabit and to interact with one another therein via avatars. This habitation usually is represented in the form of two or three-dimensional graphical representations of humanoids (or other graphical or text-based avatars). Some, but not all, virtual worlds allow for multiple users. Many VUs are represented using 3-D graphics and landscapes, and are populated by many thousands of users, known as "residents." Other terms for a VU include metaverse and "3D Internet."

The world being simulated typically appears similar to the real world, with real world rules such as gravity, topography, locomotion, real-time actions, and communication. This type of virtual world is now most commonly found in massively multiplayer, on-line games (Second Life®, Entropia Universe®, The Sims Online™,), particularly massively multiplayer on-line role-playing games such as EverQuest®, Ultima On-line, Lineage™, World of Warcraft®, or Guild Wars™.

Avatars in virtual worlds have a wide range of business and social experiences, and such experiences are becoming more important since business and social transactions are becoming common in virtual worlds such as Second Life. In fact, the characteristics of an Avatar play important social, business, and other related roles in virtual worlds, such as Second Life®. Second Life® is a privately owned 3-D virtual world, made publicly available in 2003 by Linden Lab. The Second Life virtual world is computed and managed by a large array of servers that are owned and maintained by Linden Lab. The Second Life® client program provides its users (referred to as residents) with tools to view, navigate, and modify the Second Life® world and participate in its virtual economy. Social and business interactions are important in Second Life®, and these interactions include resident interactions in both personal and business meetings.

It should not be assumed that the utility of virtual worlds is limited to game playing, although that is certainly seen to be useful and valuable insofar as it has become a real economic reality with real dollars being exchanged. However, the usefulness of virtual worlds also includes the opportunity to run corporate conferences and seminars. It is also used to conduct virtual world classroom sessions. Governmental and instructional opportunities abound in the virtual world. Accordingly, it should be fully appreciated that the term "virtual" as applied to this technology does not in any way make it less real or less valuable than the "real" world. It is really an extension of current reality. Moreover, it is an extension that greatly facilitates human communication and interaction in a non-face-to-face fashion.

SUMMARY OF THE INVENTION

The present invention captures the behavior of the user as well as the credentials (password, certificates, biometrics, and so forth) used during the authentication process and the computing session. This is useful in a virtual universe environment because an avatar can readily change regions via a link or teleportation, and no behavior records are captured in any subsequent region visited. The captured behavior patterns (collections of historical attributes) enable each region to make determinations regarding an entering avatar for such things as past criminal, financial, and unethical activities.

In accordance with one embodiment of the present invention, there is provided a method for regulating crossing of region borders by avatars in a virtual universe. The method comprises the steps of: providing the avatar with a public key pair of indicia for secure communication with a regional authority that is associated with the region; storing, with a trusted third party, a persona, protected with said public key pair, the persona being associated with the avatar; and authorizing access to the region, or to another region, by the avatar.

Further, in accordance with one embodiment of the present invention, there is provided a method for deploying a system for controlling crossing of region borders by avatars in a virtual universe environment. The method includes, for instance: providing a computer infrastructure operable to provide the avatar with a public key pair of indicia for secure communication with an authority associated with the region and for secure communication with a trusted third party; store, with the trusted third party, a persona, protected with the public key pair, the persona being associated with the avatar; and determine permission, to cross a boundary of said region, or of another region, for said avatar, by the authority subsequent to the authority confirming validity of the persona with the trusted third party, using the public key pair.

Yet further, in accordance with one embodiment of the present invention, there is provided a computer readable medium which includes program instructions for controlling crossing of region borders by avatars in a virtual universe environment. The instructions implement a method, including, for instance: providing the avatar with a public key pair of indicia for secure communication with an authority associated with the region and for secure communication with a trusted third party; storing, with the trusted third party, a persona, protected with the public key pair, the persona being associated with said avatar; and determining permission, to cross a boundary of the region, or of another region, for the avatar, by the authority subsequent to the authority confirming validity of said persona with the trusted third party, using the public key pair.

Yet further, in accordance with one embodiment of the present invention, there is provided a data processing system whose memory includes program instructions for controlling crossing of region borders by avatars in a virtual universe environment. The instructions implement a method, including, for instance: providing the avatar with a public key pair of indicia for secure communication with an authority associated with the region and for secure communication with a trusted third party; storing, with the trusted third party, a persona, protected with the public key pair, the persona being associated with said avatar; and determining permission, to cross a boundary of the region, or of another region, for the avatar, by the authority subsequent to the authority confirming validity of said persona with the trusted third party, using the public key pair.

Avatars provide a Region Authority with a URL that contains the avatars' credentials and personal data. This data is validated by the Regional Authority using Public Cryptography (Public and Private Keys) which are held by a trusted third party.

Additional features and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION OF THE INVENTION

Figure 1:
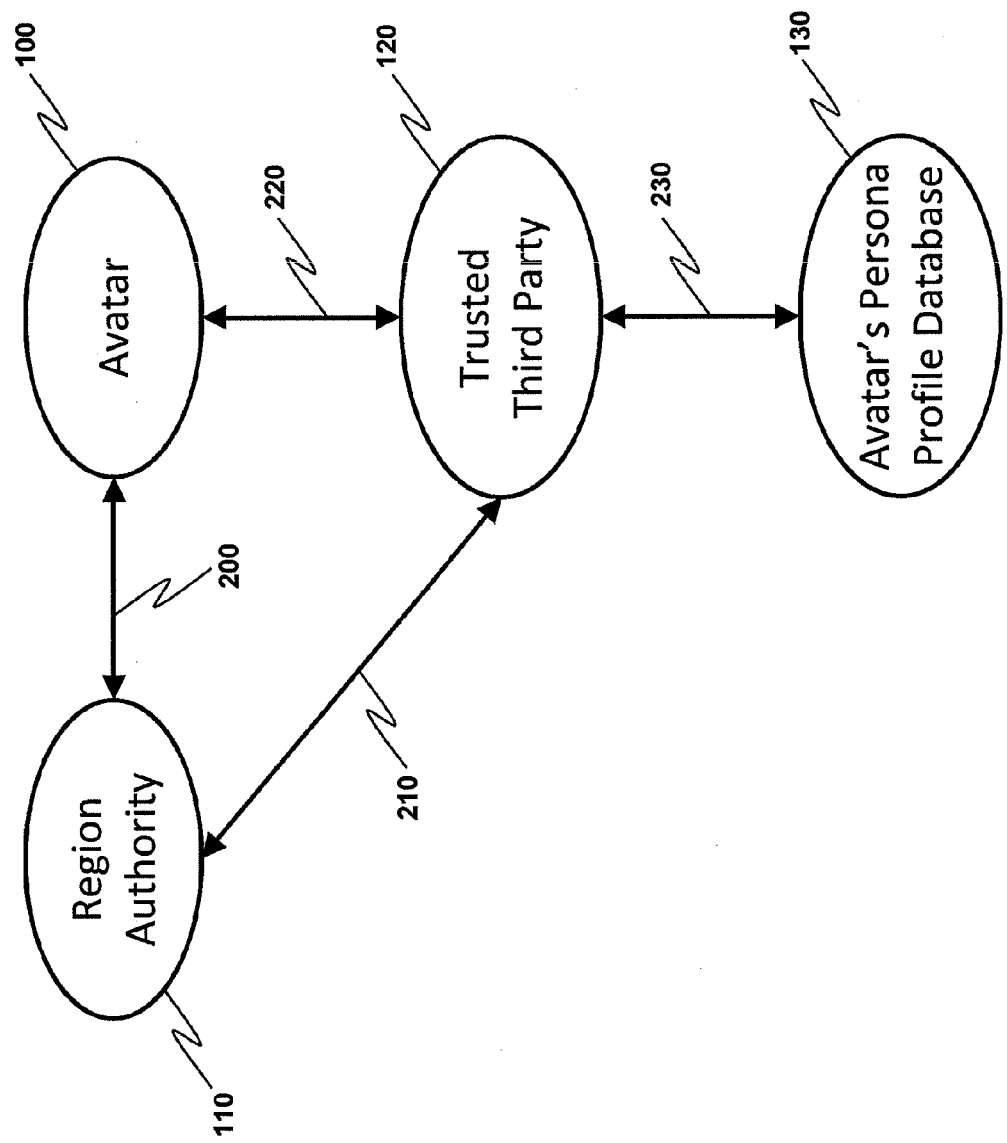
FIG. 1 is a transaction diagram illustrating the components involved in having the Avatar authenticate into a region and the updating of the Avatar's profile when leaving the region.

One mechanism for authenticating a user to machine is by a handshake between both parties. This handshake is a form of 1 to N form factors for identifying the user to the machine. A form factor is considered a type of knowledge that a user presents to the authenticating party. Some examples of form factors include the following: (1) a password, which is a single form factor; (2) a token that generates a onetime password; and (3) a token, biometric, and private key to process a protocol (SSL v3, for example), this being a three form factor. This process is repeated over and over, with no retention of knowledge from any previous sessions. These mechanisms are, however, region specific and do not account for an avatar's ability to cross the borders of a region.

In order to better understand the present invention and the advantages that it produces, it is useful to provide descriptions of some of the VU concepts and terms that are encountered. The list below is exemplary and is not intended to be all inclusive.

Avatar: An Internet user's representation of himself or herself, whether in the form of a three-dimensional model used in computer games or in the form of a program agent.

Persona Profile: A collection of attributes that describe an Avatars' characteristics, buying habits, behaviors, et cetera.

Region Authority: A regional gatekeeper that regulates access of Avatars to one or more regions.

Trusted Third Party: An entity which facilitates interactions between two parties both of whom trust the third party; they use this trust to secure their own interactions.

Services Provider: Provides the Internet connectivity to Avatars in a virtual world.

Certificate Authority: A signing authority, once a Registration Authority (or other entity which essentially performs functions of identity verification, much like those which might be performed by a Notary Public) ensures the identity of an individual or machine. The CA creates a certificate of authenticity using a Public key.

Light Weight Directory Access Protocol (LDAP): A protocol to query and modify entries in a directory like X500, which supports millions of entries. The Directory is used to store the Public keys and/or a Certificate of Authority.

Note too that, throughout this disclosure, for clarity of presentation only, reference is made to an individual or avatar, which is a digital representative of the individual. However, it should be noted that this term not only applies to an individual, but to any computerized processes that may execute on behalf of the individual, using the same credentials and capabilities of the individual that owns/regulates the process. In general, this embodies many forms, such as prescheduled, automatically running maintenance processes, system level processes (owned by the system administrator), etc. In all cases, this process is treated like an avatar, with the same inputs and outputs, regardless of whether the credentials come directly from an individual or from a computerized process acting in his or her stead.

An important aspect of the present invention is the use of a Public Key Infrastructure (PKI) as the underpinning for how Avatars, Avatars' Persona Profiles, (APP), Region Authorities (RA), and Trusted Third Parties (TTP) are associated and to provide trusted exchanges. The present invention exploits the art of PKI by adding the ability to authorize a transfer between regions based not only on credentials, but also on the profile of the avatar that contains detailed history of past actions, violations, inventory held et cetera. For example, an avatar may have, at one time in the past Held an item, or had in inventory, something illegal such as fake money, pornography et cetera.

Visited a virtual place that is not authorized by the region to be teleported to (such as a "virtual" Cuba or North Korea).

Spoken to another avatar which is not authorized by the region to which the avatar is to be teleported (such as a known hacker avatar or some other unscrupulous character).

Violated a behavior rule such as disorderly conduct, violent behavior, aggressive behavior.

This information is stored in the avatar's persona and is used as a final check to authorize a movement into or out of a region in the virtual world. It should be noted that this invention can be used to authorize exit from a region as well as entry. For example, when leaving a virtual museum, the avatar cannot be holding any object that is the property of the museum.

In the present invention, the PKI does not need to be under a single Certificate Authority, (CA) since CA's can be cross certified so that distributed regions can define and manage their own policies. Each entity (Avatar, Region Authority, Service Provider and Trusted Third Party) is required to obtain a Public key pair under a CA. The Public key Certificate is then published in the CA's user certificate directory (for example, an LDAP directory). The CA may be different for each of the entities stated above, or it could be the same, in which case communication and sharing of information is quicker within the same trust chain. The PKI is the basis of how each of the entities trust each other when credentials are shared between the parties or when a document is signed. A digital signature is a non-repudiated binding on data. This creates the trust model between entities.

Given this background, the Trusted Third Parties are usually located and serviced closest to the Avatar's home location (that is, the starting point for each session in a virtual world environment). In a distributed architecture, this means that the TTPs might be accessible near an ISP node where load balancing is optimized for workloads. The TTPs store an Avatar's Persona Profile, and sections of the profile are signed and/or encrypted by the Avatar's private key. Other sections of the profile are updated by the RA with a time-stamp/signature on the inserted or modified entry. The TTP also runs virus scans on the profile to ensure that no malicious code is attached to the profile during an update or modify operation. The above describes how the Avatar's data is stored in a Trusted entity and how only authorized entities can obtain the data to view or to append to it. This means that no one can alter the Avatar's profiles without a trail of when it was changed and by whom.

The RA needs credentials, to authenticate to the TTP, that the Avatar provides to the RA when first authenticating into the region. The RA has the choice to pull a copy of the APP from the TTP once the Avatar has provide the RA with a signed and time stamped document stating what can be viewed and obtained, or the RA can view and modify the APP at the TTP site. In a preferred embodiment, only one RA has access to the APP at a time for updating the profile. If the avatar is to clone or spawn off itself, each RA performs the above steps. The above describes different mechanisms for how the RA can obtain the avatar's profile, so that allowable information can be provided to the RA. This regulates the privacy of the avatar when transporting into regions.

FIG. 1 illustrates the transactions that occur between avatar 100, Region Authority 110, and Trusted Third Party 120 which has access to the avatar's persona profile database 130. In transaction 200, the avatar logs into a region and provides a URL address for the Trusted Third Party. The avatar also signs a document for Region Authority 110 and for Trusted Third Party 120. In transaction 220, avatar 100 creates a persona profile which is digitally signed and stored (transaction 230) in database 130 by Trusted Third Party 120. Attention is now focused on transaction stream 210 which occurs between Region Authority 110 and Trusted Third Party 120. In particular, Region Authority 110 logs into Trusted Third Party 120 and provides this party with the signed document. Trusted Third Party 120 obtains the profile from database 130 and sends it back to the Region Authority 110. Region Authority 110 checks the behavior patterns of the avatar and/or other persona characteristics. If Region Authority 110 approves, the avatar is allowed into the region. Once the avatar leaves the Region Authority's region, Region Authority 110 signs an updated section of the document. Region Authority 110 then logs into Trusted Third Party 120 and provides that party with an update.

When an avatar transfers from one region to another, the present method is employed to determine whether there is any information pertaining to the person that should be used to deny access to the region. An expired profile, a region that should not have been visited in the past, or other information may cause entry into the target region to be denied. The persona profile provides this check in the virtual world. Because the profile contains past behavior information, inventory information, last places visited, et cetera, an inspection of the persona profile is used to grant or deny access. The following determiners may be used to deny access to an Avatar:

Inventory information may show that the avatar is carrying something that is not allowed. For example, malicious software. (This is achieved by either scanning the avatar's inventory in real time, or looking up the inventory stored in the avatar's persona profile to see if the inventory comprises something unauthorized)

The Avatar's behavioral history, particularly if it is improper in some sense as defined for the region or the virtual universe, may alert the regional authority to revoke permission to enter, or to increase sensors around the avatar as a proactive approach to protect against potential problems. The avatar may also be required to provide a security toll or to place one or more inventory items with another to be held as security.

Past conversational information may show that the avatar poses a threat, for example, due to having had a conversation with a known hacker or other category of forbidden avatar.

The avatar may not conform to a required visual format (only human forms permitted).

Based on any or all of this information, the avatar is granted or denied access by the Regional Authority.

In yet another embodiment, the present invention provides a business method that performs the process steps of the invention on a subscription, advertising, and/or fee basis. That is, a service provider, such as a Solution Integrator, offers to provide both manual and automatic regulating over the crossing of region borders by avatars in a virtual universe. In this case, the service provider creates, maintains, supports, et cetera, a computer infrastructure that performs the process steps of the invention for one or more customers. In return, the service provider receives payment from the customer(s) under a subscription and/or fee agreement and/or the service provider receives payment from the sale of advertising content to one or more third parties.

In summary, as virtual worlds become increasing popular for both business and pleasure, and users access multiple virtual worlds, it is highly desirable that regulates such as those described in the present invention are implemented.

Figure 2:
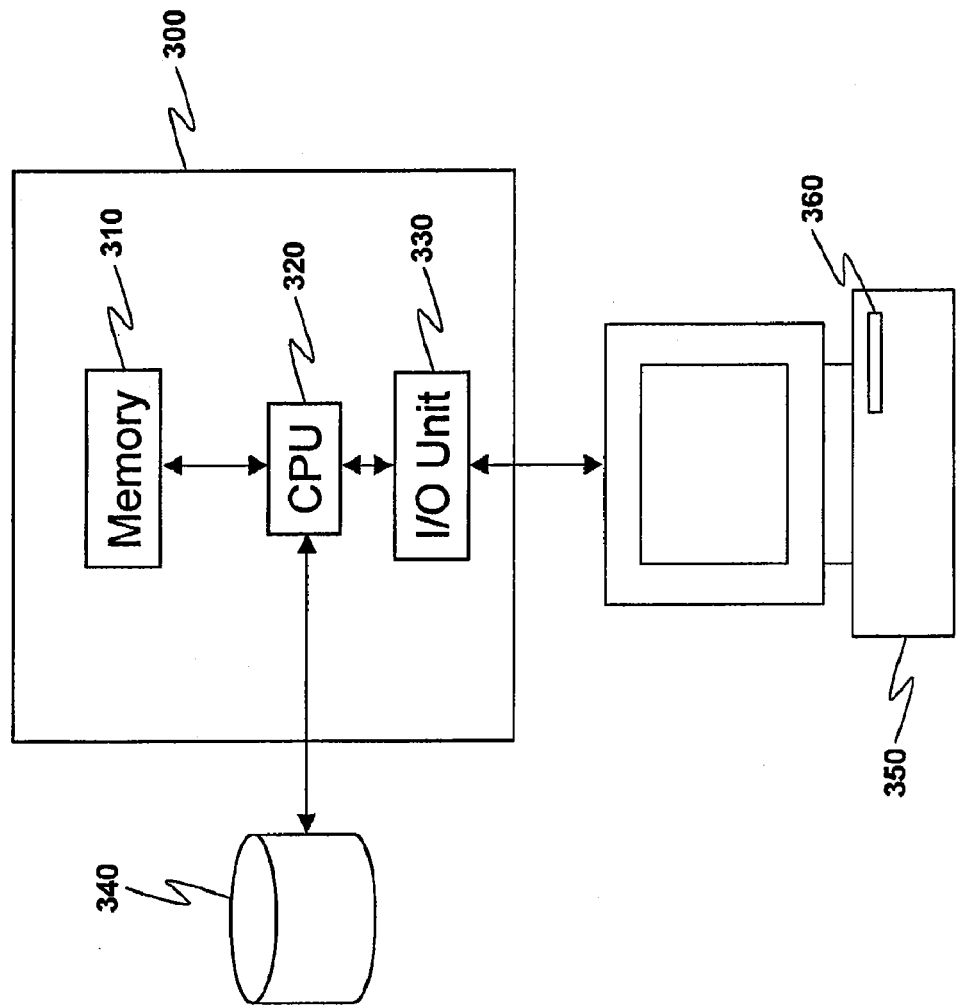
FIG. 2 is a block diagram illustrating a system which an end user typically employs to use the present invention.
Figure 3:
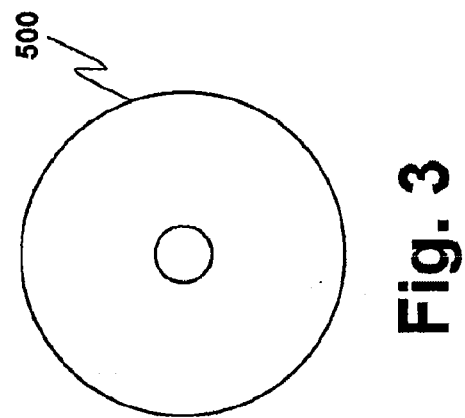
FIG. 3 illustrates one form of machine readable medium, a CD-ROM, on which program instructions for carrying out the steps of the present invention may be provided.

In any event an end user environment in which the present invention operates is shown in FIG. 2. The present invention operates through a data processing environment which effectively includes one or more of the computer elements shown in FIG. 2. While FIG. 2 is more suited for illustrating an end user environment, it is noted that a similar, albeit typically much larger, data processing system is connected via the Internet to the local environment depicted. In particular, a similar non-volatile memory 340 is typically present at the server end to contain program instructions for carrying out the virtual reality program which are loaded into a corresponding main memory 310 for execution. Turning to a local focus, computer 300 includes central processing unit (CPU) 320 which accesses programs and data stored within random access memory 310. Memory 310 is typically volatile in nature and accordingly such systems are provided with non-volatile memory typically in the form of rotatable magnetic memory 340. While memory 340 is preferably a nonvolatile magnetic device, other media may be employed. CPU 330 communicates with users at consoles such as terminal 350 through Input/Output unit 330. Terminal 350 also typically includes drive or port 360 for the reading and writing of removable media. Terminal 350 is typically one of many, if not thousands, of consoles in communication with computer 300 through one or more I/O unit 330. In particular, console unit 350 is shown as having included therein a device for reading medium of one or more types such as CD-ROM 500 shown in FIG. 3. Media 500, an example of which is shown in FIG. 3, comprises any convenient device including, but not limited to, magnetic media, optical storage devices and chips such as flash memory devices or so-called thumb drives. Disk 500 also represents a more generic distribution medium in the form of electrical signals used to transmit data bits which represent codes for the instructions discussed herein. While such transmitted signals may be ephemeral in nature they still, nonetheless constitute a physical medium carrying the coded instruction bits and are intended for permanent capture at the signal's destination or destinations.

Figure 4:
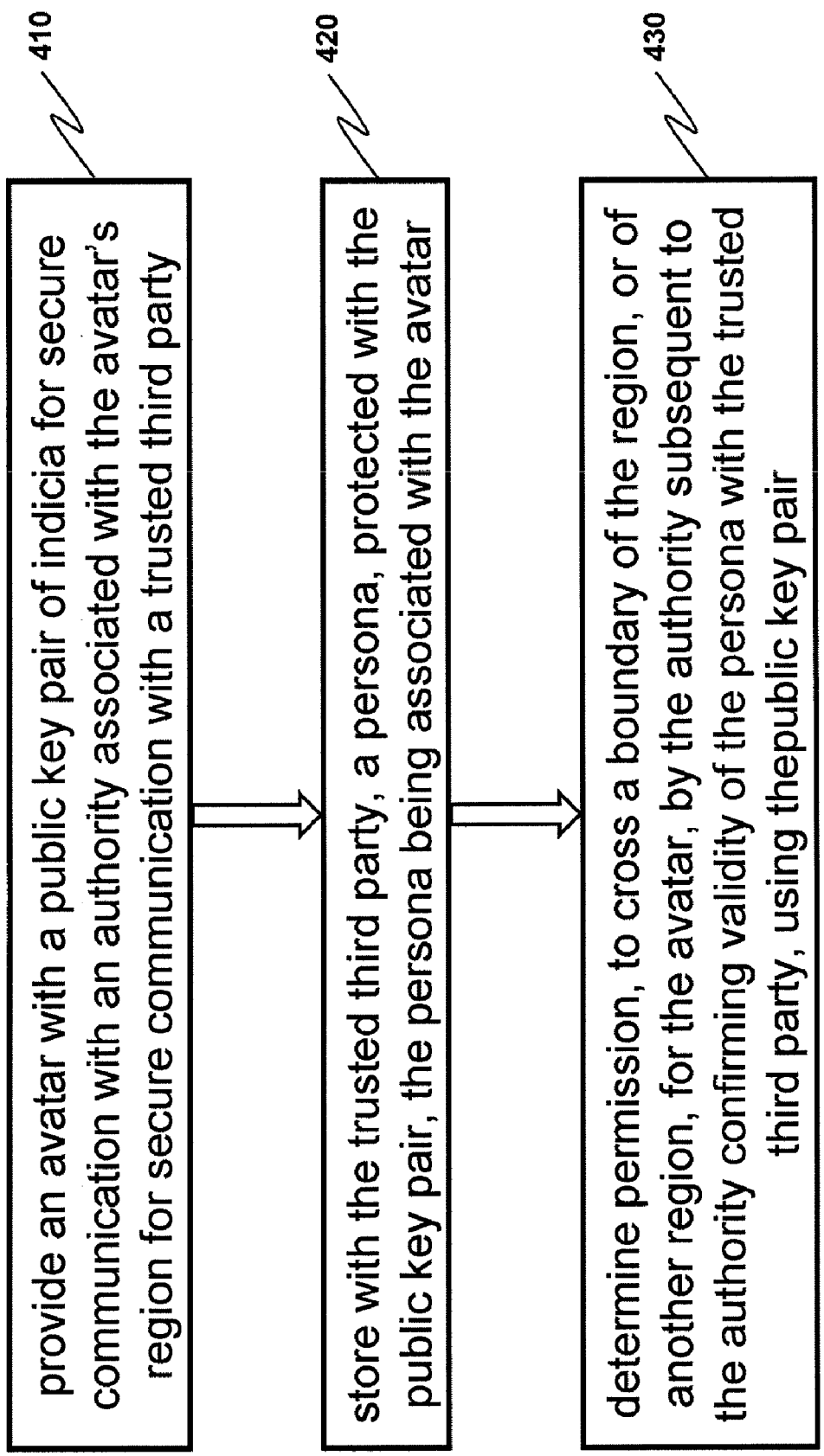
FIG. 4 is a block diagram illustrating the steps practiced in accordance with the present invention.

FIG. 4 illustrates the principle steps associated with the practice of the present invention. In particular, in step 410, an avatar is provided with a public key pair of indicia for secure communication with an authority associated with the avatar's region and for secure communication with a trusted third party. In step 420, a persona associated with the avatar, and protected with the public key pair, is store with the trusted third party. In step 430, permission, to cross a boundary of the region, or of another region for the avatar, is determined by the authority subsequent to the authority confirming validity of the persona with the trusted third party, using the public key pair.

While the invention has been described in detail herein in accordance with certain preferred embodiments thereof, many modifications and changes therein may be effected by those skilled in the art. Accordingly, it is intended by the appended claims to cover all such modifications and changes as fall within the spirit and scope of the invention.

What is claimed is:

1. A method comprising:
    regulating crossing, by an avatar, of a region boundary of a region in a virtual universe, the crossing of the region boundary comprising entering the region by the avatar or exiting the region by the avatar, the regulating comprising:
        providing said avatar with a public key pair of indicia for secure communication with a region authority associated with said region, and for secure communication with a trusted third party, the region authority regulating access of the avatar to one or more regions in the virtual universe, and the trusted third party storing a persona profile of the avatar, protected with said public key pair, said persona profile comprising one or more attributes describing the avatar;
        providing, by the avatar, credentials to the region authority, the credentials indicating permission of the region authority to obtain the persona profile from the trusted third party;
        responsive to the region authority providing the credentials to the trusted third party, the trusted third party obtaining the persona profile and providing the persona profile to the region authority; and
        determining by the region authority whether to deny permission of the avatar to cross the region boundary based on the one or more attributes of the persona profile provided by the trusted third party.

2. The method of claim 1 in which, responsive to the determining, permission of the avatar to cross the region boundary is denied.

3. The method of claim 2 in which the one or more attributes describe one or more items held by the avatar, and wherein said permission is denied since an item of the one or more items held by said avatar is found to preclude entry.

4. The method of claim 2 in which the one or more attributes describe one or more items contained in inventory associated with the avatar, and wherein said permission is denied since an item of the one or more items contained in the inventory is found to preclude entry.

5. The method of claim 2 in which the one or more attributes indicate that the avatar has no authority to enter the region, and wherein said permission is denied since said avatar has no authority to enter the region.

6. The method of claim 2 in which the one or more attributes indicate interactions with one or more other avatars, and wherein said permission is denied since said avatar has interacted with at least one other forbidden avatar.

7. The method of claim 2 in which the one or more attributes indicate behavioral history of the avatar, and wherein said permission is denied since said one or more attributes indicate violation of a behavioral rule by said avatar.

8. The method of claim 1 in which, responsive to the determining, permission of the avatar to cross the region boundary is granted.

9. The method of claim 1 in which in determining said permission, permission is denied since said avatar has acquired an object which is precluded from leaving the region.

10. The method of claim 1 further including providing, by the region authority, a time stamp for data exchanged with said trusted third party.

11. The method of claim 1 further including scanning, by the trusted third party, said persona profile for malicious code.

12. The method of claim 1 further including providing, by the trusted third party, said persona profile with information as to time associated with changes thereto and an identifier associated with a changing entity thereof.

13. The method of claim 1 in which permission is denied since said persona profile has expired.

14. The method of claim 1 further including granting permission of the avatar to cross the region boundary based on payment of a toll.

15. The method of claim 1 further including granting permission of the avatar to cross the region boundary based on the avatar providing an inventory item to be held as security.

16. The method of claim 1 in which permission is denied since said avatar does not possess a required visual format.

17. The method of claim 1 wherein the region authority comprises one region authority of multiple region authorities of the virtual universe, and wherein said region authority is the only region authority of the multiple region authorities with access to said persona profile.

18. The method of claim 1 in which said public key pair is obtained under a certificate of authority.

19. A method comprising:
providing a computer infrastructure operable to regulate crossing, by an avatar, of a region boundary of a region in a virtual universe, the crossing of the region boundary comprising entering the region by the avatar or exiting the region by the avatar, wherein the regulating comprises:
- providing said avatar with a public key pair of indicia for secure communication with a region authority associated with said region, and for secure communication with a trusted third party, the region authority regulating access of the avatar to one or more regions in the virtual universe, and the trusted third party
- storing a persona profile of the avatar, protected with said public key pair, said persona profile comprising one or more attributes describing the avatar;
- providing, by the avatar, credentials to the region authority, the credentials indicating permission of the region authority to obtain the persona profile from the trusted third party;
- responsive to the region authority providing the credentials to the trusted third party, the trusted third party obtaining the persona profile and providing the persona profile to the region authority; and
- determining by the region authority whether to deny permission of the avatar to cross a the region boundary based on the one or more attributes of the persona profile provided by the trusted third party.

20. A non-transitory computer readable storage medium containing thereon program for execution by a processor to perform a method comprising:
regulating crossing, by an avatar, of a region boundary of a region in a virtual universe, the crossing of the region boundary comprising entering the region by the avatar or exiting the region by the avatar, the regulating comprising:
- providing said avatar with a public key pair of indicia for secure communication with a region authority associated with said region, and for secure communication with a trusted third party, the region authority regulating access of the avatar to one or more regions in the virtual universe, and the trusted third party;
- storing a persona profile of the avatar, protected with said public key pair, said persona profile comprising one or more attributes describing the avatar; and providing, by the avatar, credentials to the region authority, the credentials indicating permission of the region authority to obtain the persona profile from the trusted third party;
- responsive to the region authority providing the credentials to the trusted third party, the trusted third party obtaining the persona profile and providing the persona profile to the region authority; and
- determining by the region authority whether to deny permission of the avatar to cross the region boundary based on the one or more attributes of the persona profile provided by the trusted third party.

21. A data processing system comprising:
a memory; and
a processor in communications with the memory, wherein the data processing system is configured to perform a method comprising:
regulating crossing, by an avatar, of a region boundary of a region in a virtual universe, the crossing of the region boundary comprising entering the region by the avatar or exiting the region by the avatar, the regulating comprising:
- providing said avatar with a public key pair of indicia for secure communication with a region authority associated with said region and for secure communication with a trusted third party, the region authority regulating access of the avatar to one or more regions in the virtual universe, and the trusted third party storing a persona profile of the avatar, protected with said public key pair, said persona profile comprising one or more attributes describing the avatar;
- providing, by the avatar, credentials to the region authority, the credentials indicating permission of the region authority to obtain the persona profile from the trusted third party;
- responsive to the region authority providing the credentials to the trusted third party, the trusted third party obtaining the persona profile and providing the persona profile to the region authority; and
- determining by the region authority whether to deny permission of the avatar to cross the region boundary based on the one or more attributes of the persona profile provided by the trusted third party.

* * * * *